(12) United States Patent
Gibas et al.

(10) Patent No.: US 8,227,945 B2
(45) Date of Patent: Jul. 24, 2012

(54) STEPPER MOTOR INCLUDING A LEAD SCREW ASSEMBLY

(75) Inventors: Russell A. Gibas, Old Saybrook, CT (US); Don W. Dienst, Marlborough, CT (US)

(73) Assignee: iMS Schneider Electric Motion, Malborough, CT (US)

( * ) Notice: Subject to any disclaimer, the term of this patent is extended or adjusted under 35 U.S.C. 154(b) by 0 days.

(21) Appl. No.: 13/374,331

(22) Filed: Dec. 23, 2011

(65) Prior Publication Data
US 2012/0146439 A1 Jun. 14, 2012

Related U.S. Application Data

(63) Continuation-in-part of application No. 12/586,895, filed on Sep. 30, 2009, now abandoned.

(51) Int. Cl.
*H02K 7/06* (2006.01)

(52) U.S. Cl. ...... 310/80; 310/49.18; 310/83; 310/49.47; 310/20

(58) Field of Classification Search ............... 310/49.47, 310/80, 83, 49.18, 20; 74/89.42, 424.72, 74/89.52; 403/296, 307, 342; 411/424, 399; 251/129.11
See application file for complete search history.

(56) References Cited

U.S. PATENT DOCUMENTS
5,994,806 A * 11/1999 Aoki et al. .................. 310/80
* cited by examiner

*Primary Examiner* — Joshua J Michener
*Assistant Examiner* — Chi Q Nguyen

(57) ABSTRACT

An electric stepper motor having a linear actuator arrangement consisting of an extended lead screw terminating at one end via a conical section and a threaded rod. The threaded rod at the end of the lead screw is engaged within the threaded aperture after completion of the stepper motor assembly to provide linear actuator function.

6 Claims, 1 Drawing Sheet

STEPPER MOTOR INCLUDING A LEAD SCREW ASSEMBLY

This is a Continuation in Part of U.S. patent application Ser. No. 12/586,895 now abandoned.

BACKGROUND OF THE INVENTION

Methods are currently available for converting a stepper motor rotation to a bi-directional linear motion wherein a complex interface is interconnected with the stepper motor shaft to provide the linear movement.

Two early arrangements are described within U.S. Pat. No. 3,641,828 entitled "Rotary-Linear Motion Converter" and within U.S. Pat. No. 4,324,148 entitled "Rotary/Linear Motion Converter Assembly".

A more recent arrangement for converting stepper motor rotation is the use of a linear actuator whereby a lead screw is connected with the stepper motor shaft during the stepper motor manufacture, per se.

One example of a lead screw for a linear actuator is described within U.S. Pat. No. 7,086,303 entitled "Lead Screw for Linear Actuator and Method of Manufacturing Same".

U.S. Pat. No. 6,422,101 entitled "Reinforced Lead Screw with Springless Anti-Backlash Nut" and U.S. Pat. No. 7,552,657 entitled "Long-Span Lead Screw Assembly with Anti-Backlash Nut" describe the arrangement of the lead screw relative to a stepper motor rotor.

Whereas the lead screws currently employed require supplemental means for coupling to the stepper motor shaft, or specific assembly during the stepper motor manufacture, it would be more convenient and economically feasible to attach the lead screw directly to a stepper motor shaft after stepper motor manufacture, per se.

One purpose of the instant invention, accordingly, is to provide an integrated linear actuator arrangement that could be attached to the stepper motor shaft after the stepper motor has been completely is assembled.

SUMMARY OF THE INVENTION

An electric stepper motor includes a linear actuator arrangement having an extended lead screw terminating at one end via a conical section and a threaded rod. A conical aperture within one end of a customized rotor shaft abuts a threaded aperture formed therein. The threaded rod, at the end of the lead screw, is later fastened within the threaded aperture to provide linear actuator function.

DESCRIPTION OF THE PREFERRED EMBODIMENT

Figure 1:
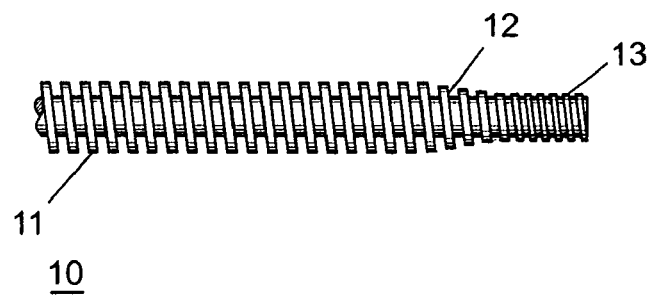
FIG. 1 is a side view of the customized lead screw according to the invention.

As shown in FIG. 1, a lead screw 10 is depicted in the form of a first threaded metal section 11 similar to that described within the aforementioned U.S. Pat. No. 7,086,303 and differs therefrom by inclusion of a conical section 12 terminating in a second diameter threaded metal section 13 of smaller diameter than the first threaded metal section 11.

Figure 2:
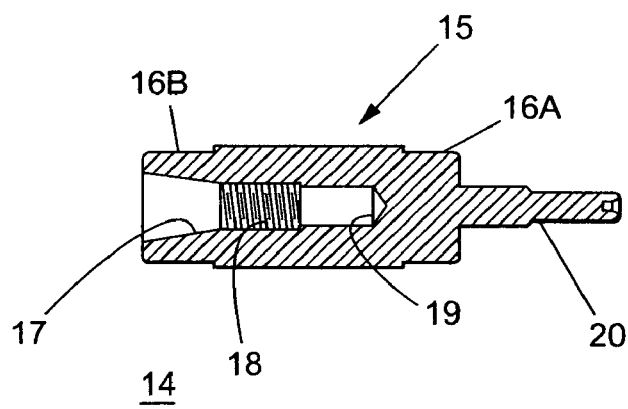
FIG. 2 is sectional side view of a stepper motor shaft customized for threadingly receiving the lead screw of FIG. 1.

In further accordance with the invention, as shown in FIG. 2, a customized stepper motor shaft 14 defining a rotor support rod 15, which includes a pair of bearing journals 16A, 16B, on the exterior surface thereof and a cone-shaped aperture 17 at one end leading to a threaded circular aperture 18 and a non-threaded circular aperture 19. A shaft 20 extends from the opposite end of the stepper motor support rod 15 for function within a stepper motor assembly as described within U.S. Pat. No. 6,967,425 entitled "Multi-functional Electric Stepper motor Assembly Having Increased Stepper motor Torque".

Figure 3:
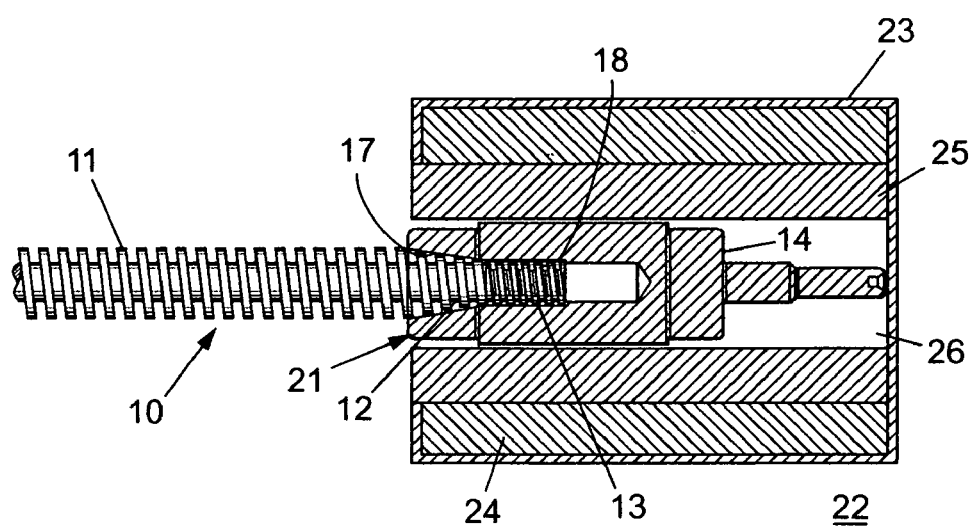
FIG. 3 is a side view, in partial section, of a stepper motor having the customized lead screw of FIG. 1 inserted within the stepper motor shaft of FIG. 2 to complete the linear actuator assembly.

The combined motor shaft-lead screw assembly 21 is now depicted in FIG. 3 with the threaded metal section 13 engaged within the threaded circular aperture 18 such that the conical section 12 sits within the cone-shaped aperture 17 and the threaded metal section 11 of the lead screw 10 extends therefrom the motor shaft 14.

The stepper motor 22 is similar to that described within aforementioned U.S. Pat. No. 6,967,425 which includes an outer wall 23 housing the stator 24, rotor 25, and with the motor shaft 14 arranged within the hollow cylinder 26 defined within the rotor 25.

Although the attachment of the lead screw 10 to the rotor shaft 14 is shown prior to completion of the stepper motor, this is for purposes of clarity. In actuality, the motor shaft 14 is part of the assembled stepper motor 22 and the lead screw 10 is assembled therein after such assembly.

This allows lead screws of various lengths and configurations to be assembled to a stepper motor without having to design each stepper motor for each lead screw, per se, which is an important feature of the invention.

A linear actuator arrangement has herein been described whereby a simple adjustment to the rotor shaft of an electric stepper motor is adjusted to receive a plurality of sized lead screws without having to design and adjust each and every stepper motor to accommodate each and every sized lead screw, as described earlier.

The invention claimed is:

1. An electric stepper motor comprising in combination:
   an electric stepper motor enclosure;
   a stator, a rotor and a stepper motor shaft within said enclosure;
   a first section of a threaded rod having a first length and a first diameter;
   a second section of said threaded rod at an opposite end of said first section, said second section being of a shorter length and smaller diameter than said first section and arranged within said stepper motor shaft; and
   a third section of said threaded rod having a conical configuration arranged intermediate of said first and said second sections.

2. The electric stepper motor of claim 1 wherein said stepper motor shaft defines a shaft extension at one end and a conical aperture at an opposite end thereof.

3. The electric stepper motor of claim 2 wherein said stepper motor shaft includes a pair of bearing journals formed on an outer surface.

4. The electric stepper motor of claim 3 wherein said stepper motor shaft includes a threaded aperture formed therein in abutment with one end of said conical aperture for receiving said second section to thereby attach said first, second and third sections of said threaded rod to said stepper motor shaft.

5. The electric stepper motor of claim 3 wherein said stepper motor shaft further includes a circular aperture formed therein in abutment with one end of said threaded aperture.

6. An electric stepper motor comprising in combination:
an electric stepper motor enclosure;
a rotor shaft including a shaft extension at one end and a conical aperture at an opposite end thereof arranged within said enclosure, said rotor shaft further including a threaded aperture formed therein in abutment with one end of said conical aperture and a circular aperture formed therein in abutment with one end of said threaded aperture;
a first threaded section of a first length and a first diameter;
a second threaded section at an opposite end of said first section, said second threaded section being of a shorter length and smaller diameter than said first threaded section; and
a third threaded section of a conical configuration intermediate said first and second threaded sections, whereby said first, second and third threaded sections are attached to said rotor shaft by engagement of said second threaded section within said threaded aperture formed within said rotor shaft.

* * * * *